US012759359B2

(12) United States Patent
Oishi

(10) Patent No.: US 12,759,359 B2
(45) **Date of Patent: *Oct. 13, 2026**

(54) AIR BAG SUSPENSION

(71) Applicant: Universal Air, Inc., San Bernardino, CA (US)

(72) Inventor: Yuzuru Oishi, Apple Valley, CA (US)

(73) Assignee: Universal Air, Inc., San Bernardino, CA (US)

( * ) Notice: Subject to any disclaimer, the term of this patent is extended or adjusted under 35 U.S.C. 154(b) by 776 days.

This patent is subject to a terminal disclaimer.

(21) Appl. No.: 18/116,387

(22) Filed: Mar. 2, 2023

(65) Prior Publication Data

US 2024/0051364 A1 Feb. 15, 2024

Related U.S. Application Data

(60) Provisional application No. 63/370,934, filed on Aug. 10, 2022.

(51) Int. Cl.

*B60G 11/27* (2006.01)
*B60G 7/00* (2006.01)
*B60G 17/052* (2006.01)

(52) U.S. Cl.

CPC .............. *B60G 11/27* (2013.01); *B60G 7/001* (2013.01); *B60G 17/0525* (2013.01); *B60G 2202/152* (2013.01)

(58) Field of Classification Search

CPC .......... B60G 7/001; B60G 9/00; B60G 11/27; B60G 11/28; B60G 17/052;

(Continued)

(56) References Cited

U.S. PATENT DOCUMENTS 2,903,256 A 9/1959 Weiss
3,784,221 A 1/1974 Frasier
(Continued)

FOREIGN PATENT DOCUMENTS

WO 2014151833 9/2014
WO 2014151833 A1 9/2014

OTHER PUBLICATIONS

International Search Report and Written Opinion issued in App. No. PCT/US23/70155, dated Nov. 8, 2023, 9 pages.

(Continued)

*Primary Examiner* — Robert A. Siconolfi
*Assistant Examiner* — San M Aung
(74) *Attorney, Agent, or Firm* — DANE IP Law PC

(57) ABSTRACT

A gas spring suspension system is configured to replace a factory-installed leaf spring-based suspension system of an automobile. The gas spring suspension system connects to the vehicle frame using the same first and second frame mounts to which the leaf spring was originally attached. The gas spring suspension system has a linkage assembly with a first link that pivotably attaches to the first frame mount and a second link that pivotably attaches to the second frame mount. The first and second links are pivotably attached to one another. A connector portion, which can be part of the first or second link, or supported therebetween, supports the vehicle axle. A gas spring is supported by the linkage assembly and is positioned operatively between the first and second links so that as the axle moves during vehicle operation, loads are communicated to the spring, and through the linkage to the first and second frame mounts.

15 Claims, 13 Drawing Sheets

(58) Field of Classification Search
CPC .......... B60G 17/0525; B60G 2204/126; B60G 2204/421; B60G 2204/43065; B60G 2206/911; B60G 2500/30
USPC ........................................................ 267/64.11
See application file for complete search history.

(56) References Cited

U.S. PATENT DOCUMENTS

| | | | | |
|---|---|---|---|---|
| 3,785,673 | A | 1/1974 | Harbers | |
| 3,794,344 | A | 2/1974 | Raidel | |
| 4,033,608 | A | 7/1977 | Sweet | |
| 4,171,830 | A | 10/1979 | Metz | |
| 4,379,572 | A * | 4/1983 | Hedenberg | B60G 9/00 280/124.157 |
| 4,397,478 | A | 8/1983 | Jensen | |
| 4,518,171 | A * | 5/1985 | Hedenberg | B60G 11/27 280/86.75 |
| 4,529,224 | A | 7/1985 | Raidel | |
| 4,568,094 | A | 2/1986 | Lovell | |
| RE32,736 | E | 8/1988 | Lovell | |
| 4,763,923 | A | 8/1988 | Raidel | |
| 4,856,812 | A | 8/1989 | Stephens | |
| 4,934,733 | A | 6/1990 | Smith | |
| RE33,630 | E | 7/1991 | Griffin, Sr. | |
| 5,046,752 | A | 9/1991 | Stephens | |
| 5,346,247 | A * | 9/1994 | Snyder | B60G 11/465 267/31 |
| 5,351,986 | A * | 10/1994 | Hedenberg | B60G 11/465 267/31 |
| 5,427,404 | A | 6/1995 | Stephens | |
| 5,458,360 | A | 10/1995 | Raidel, Sr. | |
| 5,549,322 | A | 8/1996 | Hauri | |
| 5,560,641 | A | 10/1996 | Vogler | |
| 5,615,906 | A | 4/1997 | Raidel, Sr. | |
| 5,649,719 | A | 7/1997 | Wallace | |
| 5,816,605 | A | 10/1998 | Raidel, Sr. | |
| 6,007,078 | A | 12/1999 | Gottschalk | |
| 6,220,587 | B1 | 4/2001 | McKenzie | |
| 6,340,165 | B1 | 1/2002 | Kelderman | |
| 6,375,203 | B1 | 4/2002 | Warinner | |
| 6,394,474 | B1 | 5/2002 | Warinner | |
| 6,398,243 | B1 | 6/2002 | Hedenberg | |
| 6,471,223 | B1 | 10/2002 | Richardson | |
| 7,077,408 | B2 | 7/2006 | Hedenberg | |
| 7,178,817 | B1 | 2/2007 | Welles | |
| 7,249,780 | B1 | 7/2007 | Wilson | |
| 7,581,741 | B2 | 9/2009 | Reineck | |
| 7,775,535 | B2 | 8/2010 | Bluff | |
| 7,841,607 | B2 | 11/2010 | Dodd | |
| 7,896,369 | B2 | 3/2011 | Tomlin | |
| 7,938,416 | B2 | 5/2011 | Legros | |
| 8,177,243 | B2 | 5/2012 | Boisture | |
| 8,523,207 | B2 | 9/2013 | Dodd | |
| 8,870,203 | B2 | 10/2014 | Legros | |
| 9,352,628 | B2 | 5/2016 | Barton | |
| 10,543,730 | B2 | 1/2020 | Davis | |
| 10,766,331 | B2 | 9/2020 | Kliewer | |
| 2002/0070524 | A1* | 6/2002 | Hedenberg | B60G 9/02 280/124.1 |
| 2003/0038412 | A1 | 2/2003 | Plath | |
| 2005/0023788 | A1 | 2/2005 | Svartz | |
| 2005/0151337 | A1 | 7/2005 | Chalin | |
| 2005/0236792 | A1 | 10/2005 | Hedenberg | |
| 2006/0175775 | A1 | 8/2006 | Bolt | |
| 2006/0267296 | A1 | 11/2006 | Dodd | |
| 2007/0069495 | A1 | 3/2007 | Middlebrook | |
| 2009/0261551 | A1 | 10/2009 | Legros | |
| 2010/0219599 | A1 | 9/2010 | Lundmark | |
| 2010/0270769 | A1 | 10/2010 | Vandenberg | |
| 2011/0057371 | A1 | 3/2011 | Rezania | |
| 2011/0175317 | A1* | 7/2011 | Legros | B60G 11/27 280/124.157 |
| 2011/0272907 | A1 | 11/2011 | Stephani | |
| 2012/0161413 | A1 | 6/2012 | Subbarayalu | |
| 2014/0138922 | A1 | 5/2014 | Schwarz | |
| 2014/0167378 | A1 | 6/2014 | Koontz | |
| 2017/0015189 | A1 | 1/2017 | Batsch | |
| 2019/0061847 | A1 | 2/2019 | Barton | |
| 2019/0276102 | A1 | 9/2019 | Zuleger | |
| 2023/0294471 | A1 | 9/2023 | Yamazaki | |

OTHER PUBLICATIONS

Image 1: Suspension.
Image 2: Suspension.
Image 3: Suspension.
Image 4: Suspension.
Image 5: Suspension.
"Air Ride Conversion System Installation Instructions", https://kelderman.com/shop/amfile/file/download/file/191/product/139/.

* cited by examiner

AIR BAG SUSPENSION

CROSS-REFERENCE TO RELATED APPLICATION

The application claims priority to U.S. Provisional Application No. 63/370,934, which was filed on Aug. 10, 2022, the entirety of which is hereby incorporated by reference.

BACKGROUND

The present disclosure relates to the field of automotive suspension systems employing one or more gas springs.

A gas spring defines a chamber filled with pressurized gas, typically air. When a load is applied to the gas spring, the load compresses the gas in the chamber until the gas pressure is sufficient to produce an equal opposing force to support the load. The pressurized gas thus functions similar to a mechanical spring. Certain aspects of gas springs make them particularly advantageous for use in automotive suspension systems.

Leaf springs are often used in automobile suspension systems, particularly suspensions for trucks. Such leaf springs typically are elongated, and are mounted to a frame of the vehicle at attachment points in front of and behind the axle on both sides of the vehicle. Each leaf spring supports the axle.

It sometimes is desired to replace a factory-installed leaf spring suspension system with a gas spring-based suspension system in order to benefit from the advantages of gas springs. However, complications can arise in that gas springs are shaped much differently than leaf springs, and existing frame attachment points for the leaf springs may not readily accommodate gas springs. Other elements of the vehicle's original leaf spring-based design may also be incompatible with typical gas springs.

SUMMARY

The present disclosure discloses a gas spring-based suspension system that is configured to replace a leaf spring-based suspension system. The suspension system comprises a linkage assembly having a first link and a second link that are pivotably connected to one another at a joint. The first link can be pivotably attached to a first mount of the frame, which first mount formerly supported a first end of the leaf spring. The second link can be pivotably attached, usually via a shackle, to a second or hanger mount of the frame, which second mount formerly supported a second end of the leaf spring (via a shackle). Thus, the linkage assembly attaches to the frame at the same factory-installed mounts used by the leaf spring that is being replaced. The linkage assembly can support the axle, and thus moves with the axle. A gas spring (e.g., air bag) is interposed between portions of the first link and second link so that when the first and second links pivot relative to one another the gas spring is loaded, and thus acts as a suspension spring. In this manner, the gas spring-based suspension system mounts to and communicates suspension forces to the same portions of the frame to which the leaf spring was mounted and to which it applied such forces, and the gas spring-based suspension system is easily mountable to the vehicle using existing frame mounts.

In accordance with one embodiment the present specification provides a gas spring suspension system for a vehicle. The system comprises a linkage assembly comprising a first link and a second link that are pivotably connected to one another and also configured to be pivotably mounted to a frame of the vehicle. A gas spring is supported by the linkage assembly and has a first end connected to a mount arm of the first link, and a second end connected to a mount portion of the second link. A connector portion is configured to support an axle of the vehicle.

In some variations, the connector portion is part of the first link, and the gas spring is interposed between the connector portion and the second link. In additional variations the first link is configured to be rigid during operation so that the entire first link is rotatable as a unit about a first connector. In further variations, the second link comprises a secondary linkage having a first arm and a second arm that are rotatable relative one another.

In some variations, the first link comprises a first arm and a second arm that are each connected to the connector portion, a length of the second arm is configured to be selectively changed, and when the length of the second arm is selectively changed, the connector portion rotates about an end of the first arm. In some such variations the second arm comprises a second arm length adjustment structure configured to selectively change a length of the second arm, and wherein when the length of the second arm is selectively changed, the connector portion rotates about an end of the first arm. In some variations, the first arm comprises a first arm length adjustment structure configured to selectively change a length of the first arm. The second arm length adjustment structure can comprise an arm buckle.

Some variations additionally comprise a gas supply configured to selectively add gas to and remove gas from the gas spring. Some such variations additionally comprise a height control valve configured to measure a static ride height of the vehicle axle relative to a vehicle frame, and to selectively add gas to the gas spring when the static ride height is below an optimal level.

In additional variations the first link and the second link are pivotably connected to one another at a main joint and are elongated along a linkage axis, and the main joint comprises a bearing configured to resist deflection in a direction transverse to the linkage axis. In some such variations, the connector portion defines a saddle configured to receive the axle of the vehicle. In an additional variation, the main joint is disposed forwardly of the saddle. In yet another variation the connector portion comprises the mount arm, and the saddle is disposed on the mount arm.

In yet additional variations the first link comprises a first connector configured to pivotably attach to a first frame mount of the frame of the vehicle and the second link comprises a second connector configured to pivotably attach to a second frame mount of the frame of the vehicle so that the linkage assembly attaches to the frame of the vehicle at only the first frame mount and second frame mount.

In accordance with another embodiment, the present disclosure also provides a method of replacing a leaf spring suspension system of a vehicle. The method comprises removing a leaf spring from a first frame mount disposed forwardly of a vehicle axle and from a second frame mount disposed rearwardly of the vehicle axle, attaching a first connector of a linkage assembly to the first frame mount, and attaching a second connector of a linkage assembly to the second frame mount. The linkage assembly comprises a first link that is pivotably connected to a second link, and a gas spring that is interposed between the first link and second link. The method further includes attaching the vehicle axle to the linkage assembly so that as the vehicle axle moves generally vertically, the first link moves relative to the second link and a load is applied to the gas spring.

In some variations the first link comprises a first arm and a second arm that are connected to a connector portion, and the axle is attached to the connector portion so that a differential attached to the axle has an input shaft disposed at a first angle. The method can additionally comprise changing the length of the second arm so that the connector portion rotates about an end of the first arm and the first angle of the input shaft changes. Some such variations comprise changing the length of the first arm so that the input shaft of the differential is generally axially aligned with a driveshaft of the vehicle.

In additional variations the linkage assembly is unattached to the frame between the first frame mount and the second frame mount.

Yet additional variations additionally comprise selecting a mounting location for the gas spring from a plurality of proposed mount locations.

Yet further variations additionally comprise monitoring a static ride height of the axle and adding or removing gas from the gas spring until the static ride height is at an optimal level.

Although leaf springs can support applied loads, such as a load applied to the bed of a pickup truck, configuring a leaf spring to accommodate high loads leads to a very stiff spring rate that causes a stiff ride when the pickup is unloaded. By replacing the leaf spring with a gas spring-based suspension as discussed herein, the gas spring can initially be set to provide a compliant and comfortable ride when unloaded. When the pickup bed is loaded, however, gas can be added to the gas spring/air bag, increasing the spring rate and thus better accommodating a high load. Thus, the linkage assembly including the gas spring is able to provide a compliant ride when unloaded, but also provide adequate support when loaded. In some variations a ride frequency of a rear suspension can be set to about 1.4-1.7 Hz when unloaded. When the bed is loaded, air can be added to the air bag to again achieve a ride frequency of the rear suspension within about 1.4-1.7 Hz.

DESCRIPTION

Figure 1:
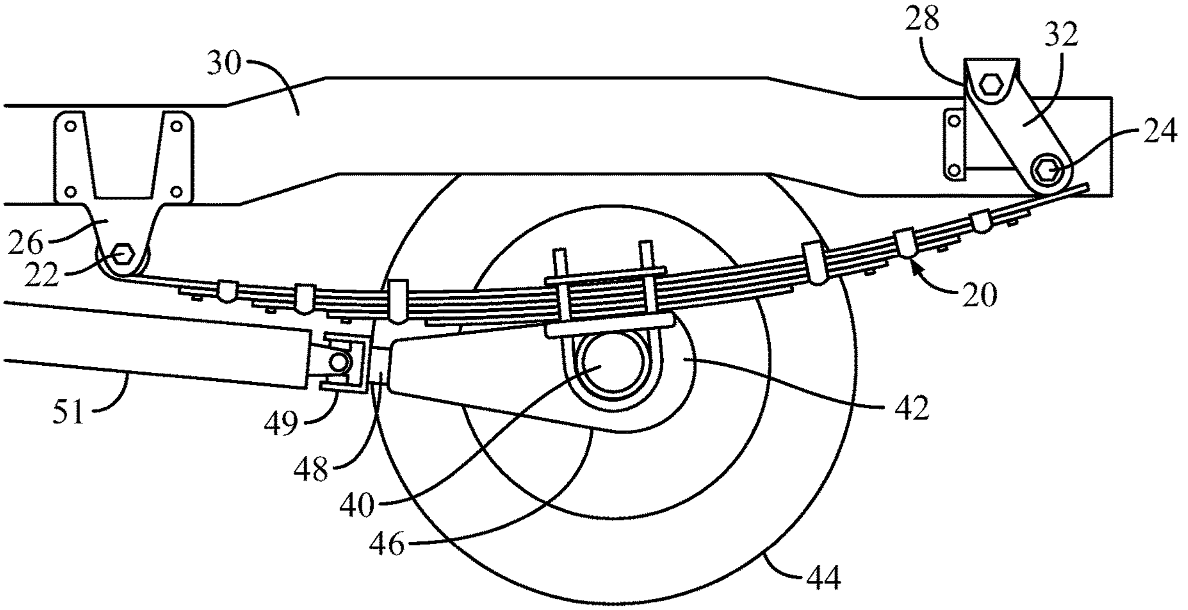
FIG. 1 (Prior Art)
FIG. 1 is a schematic side view of a leaf spring suspension system.

The present disclosure discloses a system for replacing a leaf spring 20 suspension system (see FIG. 1) in an automobile with a gas spring-based suspension system (e.g., air bag). The suspension system comprises a linkage assembly 50 (see FIG. 3) having a first link 52 and a second link 54 that are pivotably connected to one another at a joint 56. The first link 52 can be pivotably attached to a first mount 26 of the frame 30, which first mount 26 formerly supported a first end of the leaf spring 20 (FIG. 1). The second link 54 can be pivotably attached, usually via a shackle 32, to a second or hanger mount 28 of the frame 30, which second mount 28 formerly supported a second end of the leaf spring 20 (via a shackle). Thus, the linkage assembly 50 can be attached to the frame 30 at the same factory-installed mounts 26, 28 used by the leaf spring 20 that is being replaced.

The linkage assembly 50 can support the axle 40, and thus moves with the axle 40. Specifically, as the axle 40 moves up and down during driving, the first link 52 and second link 54 accommodate such movement by pivoting about the first and second frame mounts 26, 28 and each other. A gas spring 70, such as an air bag typically used with vehicular suspension systems, is interposed between portions of the first link 52 and second link 54 so that when the first and second links 52, 54 pivot relative to one another the gas spring 70 is loaded, and thus acts as a suspension spring. In this manner, the gas spring-based suspension system mounts to and communicates suspension forces to the same portions of the frame 30 (namely, the first and second mounts 26, 28) to which the leaf spring 20 was mounted and to which it applied such forces.

FIG. 1 represents a suspension system comprising a leaf spring 20 that is elongated, extending from a first connector 22 to a second connector 24. A frame 30 of an automobile includes a first frame mount 26 and a second frame mount 28. A first connector 22 of the leaf spring 20 pivotably connects to the first frame mount 26. A shackle 32 is pivotably attached to the second frame mount 28 at one end, and an opposing end is pivotably connected to the second connector 24 of the leaf spring 20. The leaf spring 20 is attached to an axle 40 via a U-bolt 42. As such, the leaf spring 20 supports and locates the axle 40. A wheel 44 is rotatably supported by the axle 40. The axle 40 also is connected to a differential 46, and an input or pinion shaft 48 is connected via a universal joint 49 to a driveshaft 51 of the automobile. Suspension loads applied to the axle 40 are communicated from the axle 40 to the leaf spring 20 and further to the frame 30 at the locations of the first frame mount 26 and second frame mount 28. Notably, in this configuration, the first frame mount 28 is spaced significantly in front of the axle 40 and the second spring mount 28 is spaced significantly behind the axle 40.

Figure 2:
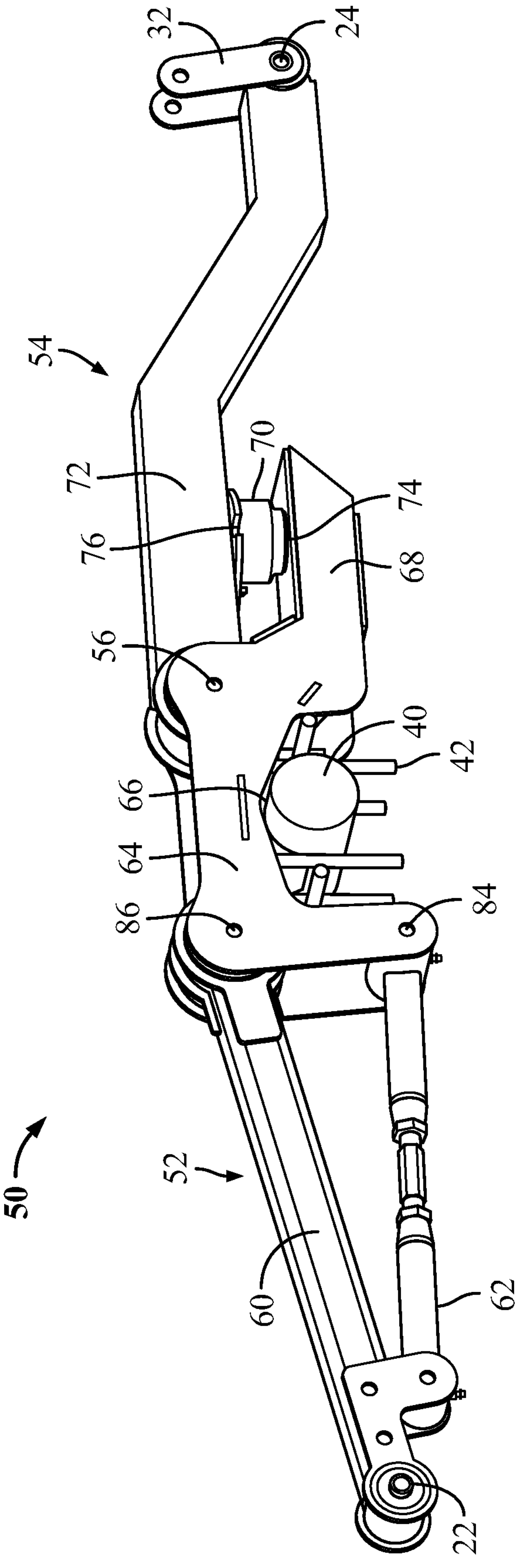
FIG. 2 is a perspective view of a linkage assembly of a gas spring-based suspension system in accordance with an embodiment.

With specific reference next to FIG. 2, a linkage assembly 50 of a gas spring-based suspension is configured to replace a factory-installed leaf spring 20. The linkage assembly 50 comprises a first link 52 and a second link 54 that are pivotably attached to one another at a main joint 56. The first link 52 includes a first connector 22 that is configured to pivotably attach to the first frame mount 26 of the automotive frame 30, which was originally constructed and positioned to accommodate a leaf spring 20. The illustrated first link 52 comprises a first arm 60 and a second arm 62 that are attached to one another and extend to and are attached to a connector portion 64. The connector portion 64 can include a saddle 66 that is configured to engage and receive an axle 40. As such, the linkage assembly 50 supports and locates the axle 40. The main joint 56 can be located in the connector portion 64 so that the second link 54 is attached to the first link 52 in the connector portion 64. In the illustrated embodiment, the first arm 60, second arm 62, and connector portion 64 are configured as a rigid body that moves as a unit. Particularly, the first link 52 is configured to rotate as a unit about the first connector 22.

As shown, a spring mount arm 68 of the connector portion 64 extends so as to overlap a spring mount portion 72 of the second link 54. A gas spring 70 can be interposed between the spring mount arm 68 and the spring mount portion 72. A first spring mount 74 can be disposed on the spring mount arm 68 and can be configured to connect to an end of the gas spring 70. A second spring mount 76 can be disposed on the spring mount portion 72 of the second link 54 and can be configured to attach to the opposite end of the gas spring 70. The illustrated gas spring 70 is an air bag such as is typically used in automotive suspension systems.

The second link 54 includes a second connector 24 that can be configured to pivotably attach to a shackle 32, which in turn attaches to the second frame mount 28 of the automotive frame 30. As with the first spring mount 26, the second frame mount 28 can have been originally installed on the frame 30 and positioned at the factory to accommodate the leaf spring 20. The illustrated second link 54 is a single unitary member that is configured to rotate about the second connector 24.

Figure 3:
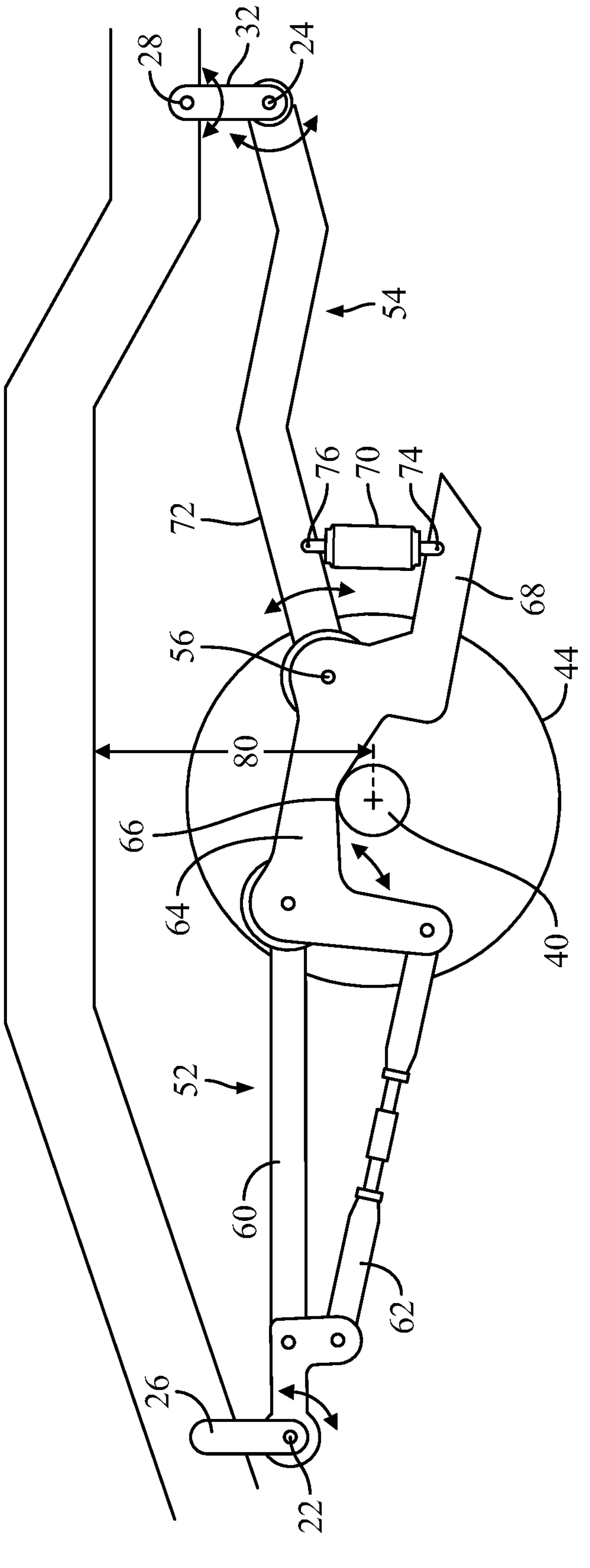
FIG. 3 is a schematic side view of the linkage assembly of FIG. 2 mounted to a frame and arranged at a first unloaded position.

With reference next to FIG. 3, the linkage assembly 50 is shown with the first connector 22 connected to the first frame mount 26 of the frame 30 and the second connector 24 is connected to the shackle 32, which in turn is connected to the second frame mount 28 of the frame 30. The axle 40 of the automobile is supported in the saddle 66 of the connector portion 64, and the wheel 44 is supported by the axle 40. In FIG. 3, the linkage assembly 50 is shown at an optimal ride height 80, which ride height 80 is the distance between the frame 30 and the center of the axle 40.

The linkage assembly 50 is configured so that, as the automobile is operated and the wheel 44 encounters bumps in the road leading to dynamic loads on the axle 40 and vertical movement of the axle 40, the first link 52 rotates relative to the second link 54 about the main joint 56, and thus forces are communicated between the spring mount arm 68 and spring mount portion 72 into the gas spring 70.

During such movement, the axle 40 can be expected to move up and down relative to the frame 30. To accommodate such up-and-down movement, the first link 52 rotates relative to the second link 54 about the main joint 56. The first link 52 will also rotate relative to the first frame mount 28 at the first connector 22, and the second link 54 will rotate relative to the shackle 32 at the second connector 24, which shackle 32 in turn may rotate relative to the second spring mount 28.

Figure 4:
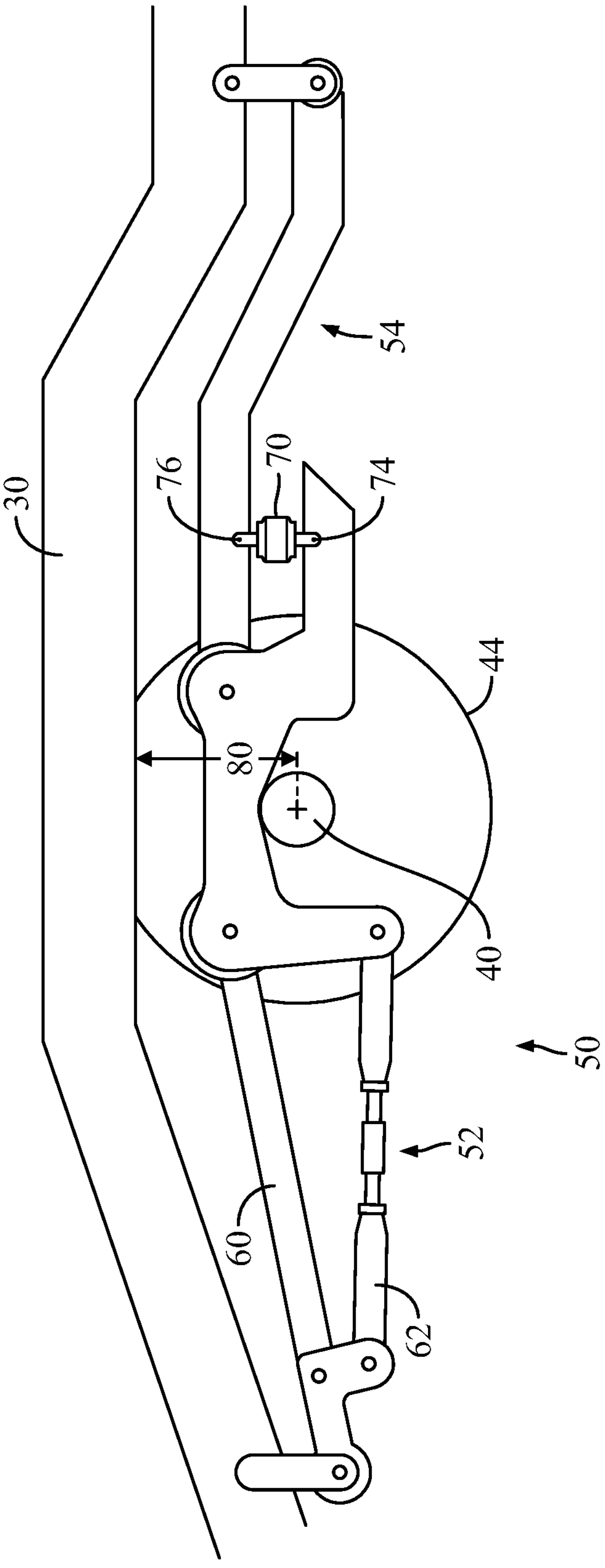
FIG. 4 is a schematic side view of the arrangement of FIG. 3 at a loaded position.

With reference next to FIG. 4, the linkage assembly 50 is shown in a position in which the ride height 80 is reduced relative to the optimal ride height 80 shown in FIG. 3. Such a position may occur as a result of dynamic loads during operation of the automobile. Such position may also be the result of a static load applied to the automobile, such as when a heavy weight is loaded into the bed of a pickup truck, or a trailer is hooked up to a hitch of the truck. In such a situation in which a static load decreases the ride height 80, the system may be configured to add gas to the gas spring 70 so as to increase pressure and gas volume within the gas spring 70 sufficient to raise the ride height 80 back to the optimal ride height 80 shown in FIG. 3. The increased pressure within the gas spring 70 provides a stiffer spring effect that better accommodates the increased load during driving.

In a practical example employing a linkage assembly 50 with a pickup, the gas spring can be configured to provide a relatively compliant ride when the truck is unloaded. Of course, when the truck bed is loaded, the gas spring 70 will compress and the ride height 80 will decrease as depicted in FIG. 4. When gas is added to the gas spring 70 so as to raise the ride height again to the optimal ride height 80 as depicted in FIG. 3, the volume of gas and pressure within the gas spring 70 has been increased, resulting in a much stiffer spring. This stiffer spring is configured to accommodate the payload while maintaining good suspension performance. In fact, in some variations the linkage assembly 50 can be configured to provide—if disposed in the rear suspension of a pickup truck—a ride frequency between about 1.4-1.7 Hz. After being adjusted to accommodate a payload the ride frequency preferably remains within about 1.4-1.7 Hz.

Figure 5:
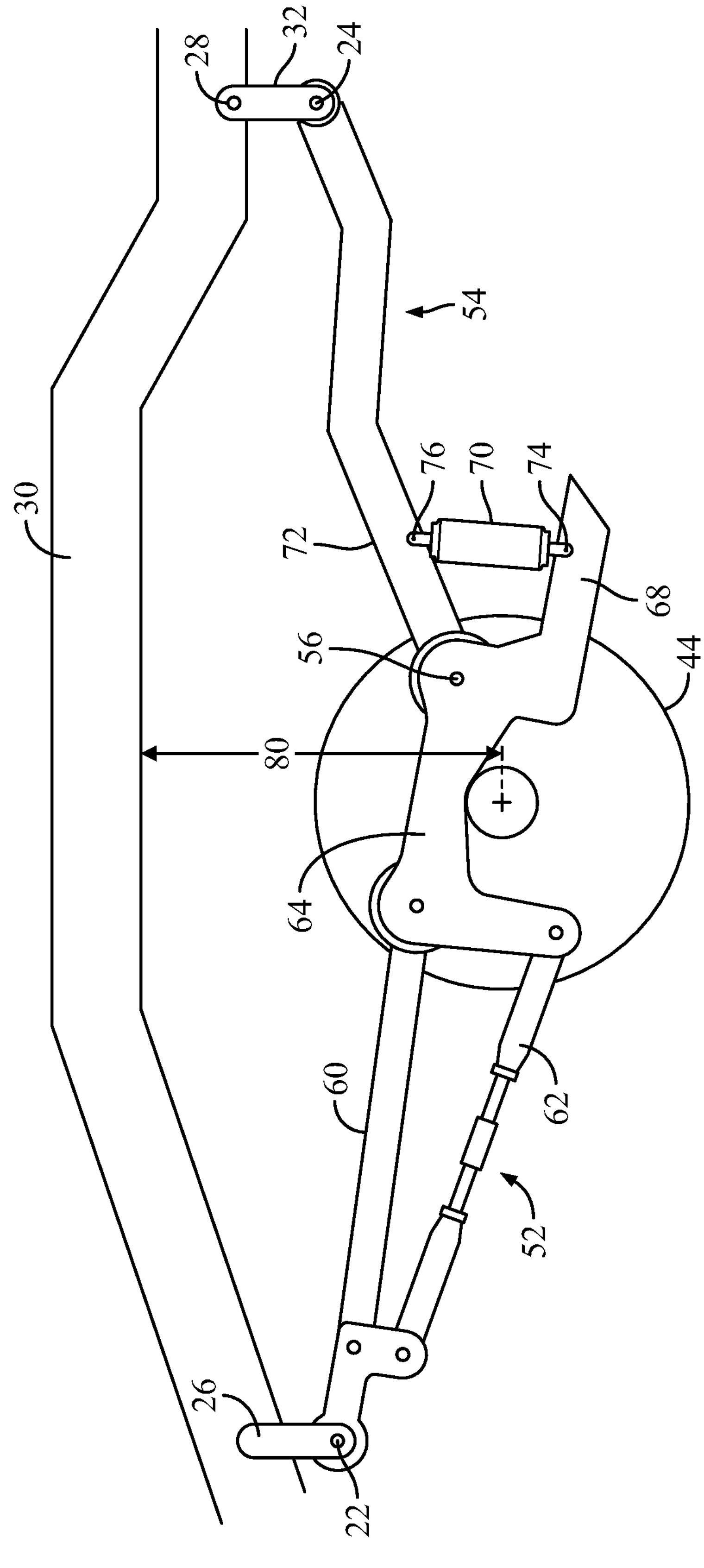
FIG. 5 is a schematic side view of the arrangement of FIG. 3 at a second unloaded position.

With reference next to FIG. 5, the linkage assembly 50 is depicted in a configuration in which the ride height 80 far exceeds the optimal ride height 80 shown in FIG. 3. Such a configuration can arise, for example, upon removal of the load for which the gas spring 70 was previously adjusted to accommodate. Removal of the load can cause the ride height 80 to increase as shown in FIG. 5. In such a situation, gas can be removed from the gas spring 70 so as to return the ride height 80 to optimal.

Figure 6:
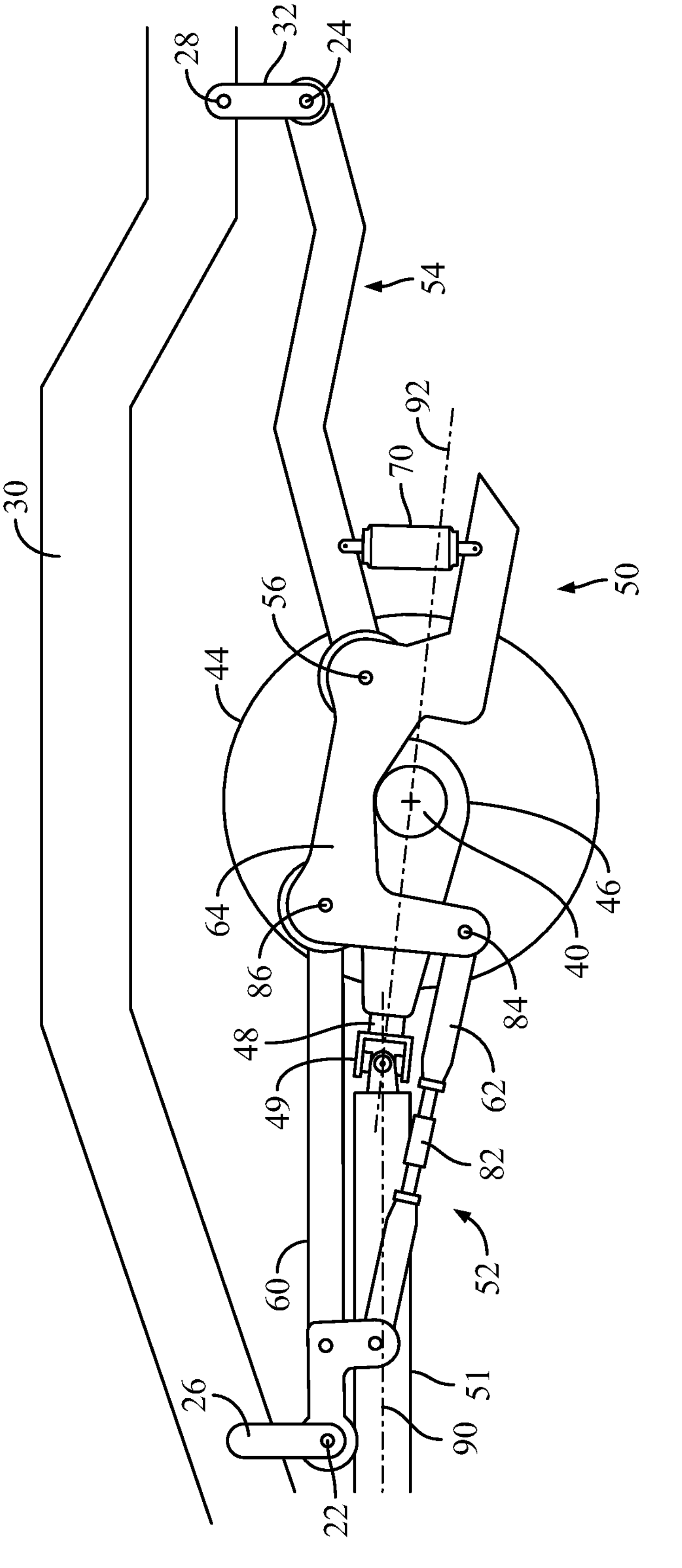
FIG. 6 is a schematic side view of the linkage assembly of FIG. 2 when mounted to a frame, driveshaft, and differential, and before making certain adjustments.
Figure 7:
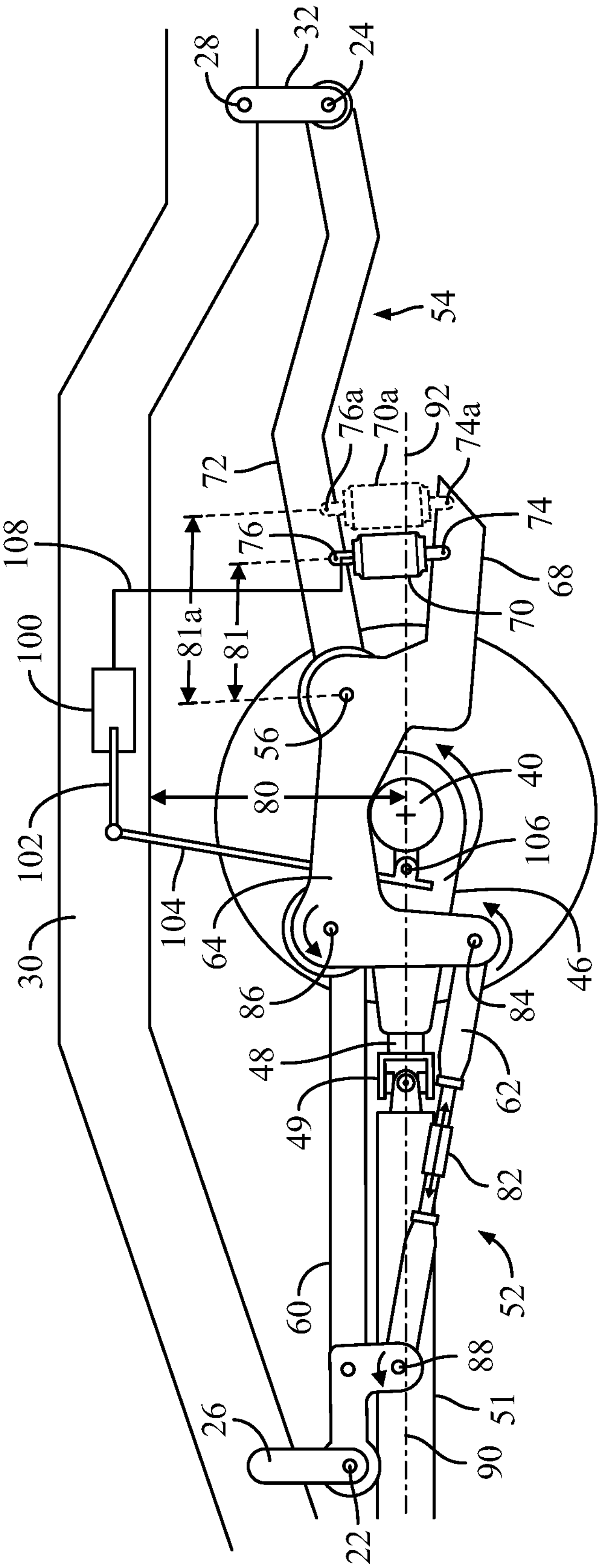
FIG. 7 is a schematic side view of the arrangement of FIG. 6 after adjustments.

With reference next to FIGS. 6 and 7, in the illustrated embodiment, the second arm 62 of the first link 52 is configured so that its length can be selectively changed. As shown, the second arm 62 includes a turnbuckle 82 which can be used to increase or decrease the length of the second arm 62. The first arm 60 attaches to the connector portion 64 at a first joint 86. The second arm 62 connects to the connector portion 64 at a second joint 84. The second arm 62 connects to the first arm 60 at a third joint 88. Each of the first through third joints 84, 86, 88 is configured to allow rotational movement. As the length of the second arm 62 changes, the connector portion 64 will rotate about the first joint 86 relative to the first arm 60. The first arm 62 also will rotate relative to the second joint 84 and the third joint 88. In the illustrated embodiment, such adjustment of the angle or attitude of the connector portion 64 relative to the first arm 60 and second arm 62 takes place only when the turnbuckle 82 is operated. Otherwise, the entire first link 52 moves together as a unit as discussed above.

FIGS. 6 and 7 show the differential 46 connected to the driveshaft 51. In the configuration shown in FIG. 6, an axis 90 of the driveshaft 51 is not aligned with an axis 92 of the pinion shaft 48 of the differential 46, even when the ride height 80 is at or near a desired level. During installation of the linkage assembly 50 such misalignment may initially occur. To correct such misalignment of the driveshaft and pinion shaft axes 90, 92, and with reference specifically to FIG. 7, the turnbuckle 82 can be actuated to, for example, lengthen the second arm 62, thus rotating the connector portion 64 about the first joint 86 and correspondingly rotating the differential 46 in a counter-clockwise rotational direction sufficient so that, as shown in FIG. 7, the axis 90 of the driveshaft 51 can be generally aligned with the axis 92 of the pinion shaft 48 at the optimal ride height 80. When the connector portion 64 rotates about the first joint 86, rotational adjustments will also be made at the second joint 84 and third joint 88. Once the length of the second arm 62 has been set, the entire link 52 moves together as a unit as discussed above.

With continued reference to FIG. 7, a variation is depicted in which the gas spring 70 can be located over a range of positions defined between the spring mount arm 68 and spring mount portion 72. For example, at a first position, the gas spring 70 is positioned so that its second spring mount 76 is spaced a first distance 81 from the main joint 56. At a second position, the gas spring 70*a* is positioned so that its second spring mount 76*a* is spaced a second distance 81*a* from the main joint 56. In some variations, specific location of the gas spring 70 can be made during installation, and preferably is selected based on the anticipated use of the automobile. As shown, the gas spring 70*a* at distance 81*a* experiences a greater lever arm of the second link 52, and thus experiences greater vertical travel for a given vertical travel of the axle 40/wheel 44 than does the gas spring 70 at distance 81. The vertical travel of the spring divided by the corresponding vertical travel of the axle 40 can be labeled a motion ratio. In this instance the gas spring 70*a* that is distance 81*a* from the main joint 56 has a greater motion ratio than does the gas spring 70 that is distance 81 from the main joint 56. Generally speaking, a setup having a greater motion ratio has a softer ride than a setup having a lesser motion ratio, and a lesser motion ratio setup has a greater tow weight capacity than a greater motion ratio setup.

With continued reference to FIG. 7, another variation is depicted in which a height control valve 100 is attached to the frame 30. An armature comprising a first arm 102 and a second arm 104 extends from the height control valve 100 to a tab 106 on the axle 40. As the ride height 80 changes due to, for example, static loads, the second arm 104 will move vertically with the axle 40, causing the first arm 102 to rotate. The height control valve 100, by reading the rotational position of the first arm 102, can calculate the ride height 80. The control valve 100 then can be configured to automatically add or remove gas from the gas springs 70 in order to adjust the ride height 80 to an optimal level. In one variation, the height control valve 100 is configured to only raise or lower the ride height 80 due to static loads rather than dynamic loads that may occur while driving. In another variation, a height control valve 100 can be provided adjacent both ends of the axle 40, so that each height control valve 100 controls gas volume of the gas spring 70 in a corresponding single linkage assembly 50.

Figure 8:
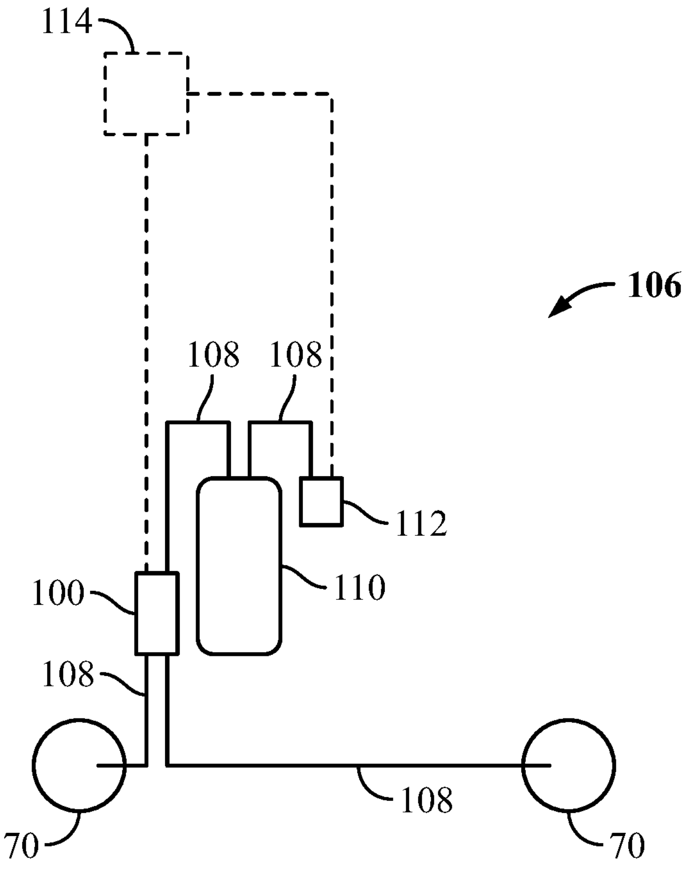
FIG. 8 is a schematic view of a pressurized gas system for use with the arrangement of FIG. 2.

With reference next to FIG. 8, a schematic representation of a gas spring system 106 shows a pair of gas springs 70 connected by gas lines 108 to the height control valve 100, which can receive gas from air tank 110. The tank 110 in turn can selectively be pressurized by a pump 112. In some variations, a controller 114 can be provided, and can be configured to control operation of the pump 112 and/or valve 100 so as to control when air is added or removed from the gas springs 70. Such a controller 114 can be automatically or manually operated. Also, it is to be understood that other structures, including non-contact measuring devices, can be used to measure ride height, and rather than a height control valve 100, the controller 114 may receive ride height 80 measurements electronically and can direct valves at or adjacent the air tank 110 to add or remove air from the gas springs 70.

With reference again to FIG. 2, the mount joint 56 can comprise a bushing. More preferably, however, the mount joint 56 comprises a bearing that is configured to enable rotational movement about the axis of the bearing, but to limit lateral movement, such as along the axis of the bearing. As such, use of a bearing at the mount joint 56 limits lateral, side-to-side deflection of the linkage assembly 50 during use. It is to be understood that one or more, or all, of the other pivot points, such as the first joint 86, second joint 84, first connector 22 and second connector 24, can also employ bearings configured to limit lateral movement.

It is to be understood that, in additional variations, a linkage assembly 50 can have various specific configurations. For example, with reference next to FIG. 9, a linkage assembly 50 includes a first link 52 having a first arm 60 and a second arm 62 that are attached to one another at a third joint 88 and extend to and are attached to a connector portion 64. The first arm 60 is attached to the connector portion 64 via a first joint 86. The second arm 62 is attached to the connector portion 64 via a second joint 84. A second link 54 is rotatably connected to the connector portion 64 via a main joint 56. Thus, the first link 52 and second link 54 rotate relative to one another about the main joint 56.

Figure 9:
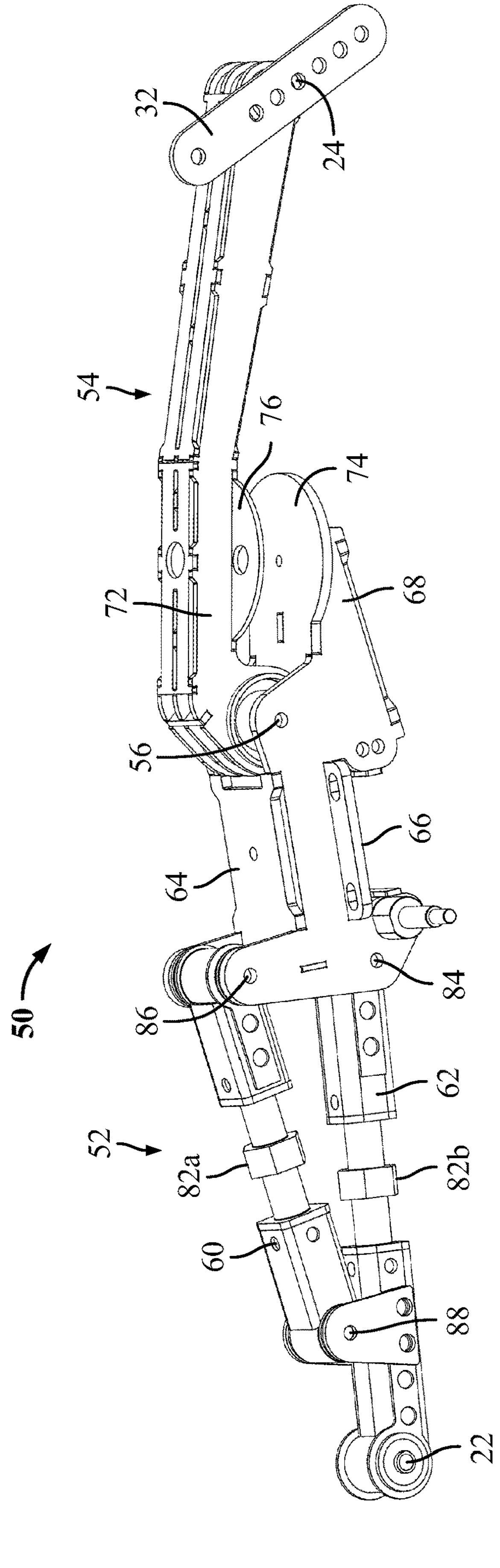
FIG. 9 is a perspective view of another embodiment of a linkage assembly.

Continuing with reference to FIG. 9, a spring mount arm 68 extends from the connector portion 64 so as to overlap a spring mount portion 72 of the second link 54. A first spring mount 74 is supported by the spring mount arm 68, and a second spring mount 76 is supported by the spring mount portion 72. The first and second spring mounts 74, 76 are arranged and configured so that an air spring (not shown) can be mounted therebetween, thus effectively establishing a spring between the first link 52 and second link 54. A saddle 66 of the connector portion 64 is configured to receive an axle (not shown) secured thereto. As shown in FIG. 9, in this embodiment the main joint 56 between the first link 52 and second link 54 is positioned behind the axle saddle 66 but in front of the spring mounts 74, 76.

In the linkage 50 shown in FIG. 9, the first arm 60 includes a turnbuckle 82*a* and the second arm 62 also includes a turnbuckle 82*b*. As such, the lengths of the first arm 60 and second arm 62 can be changed over a range of lengths. Changing the lengths of one or the other of the first arm 60 and second arm 62 can have the effect of changing the orientation of the connector portion 64 relative to the first and second arms 60, 62 which, as discussed above in connection with FIG. 7, can enable adjustments to properly align vehicle components attached or supported by the linkage 50. Also, with both the first arm 60 and second arm 62 being adjustable in length, the overall length of the linkage 50 can be correspondingly adjusted, such as during installation, so as to enable customization of installation over a range of vehicle frame configurations.

In the illustrated embodiment the lengths of the first arm 60 and second arm 62 can be adjusted via respective turnbuckles 82*a*, 82*b*, which are length adjustment structures. It is to be understood that, in additional variations, different length adjustment structures can be employed, such as telescoping members or the like.

Figure 10:
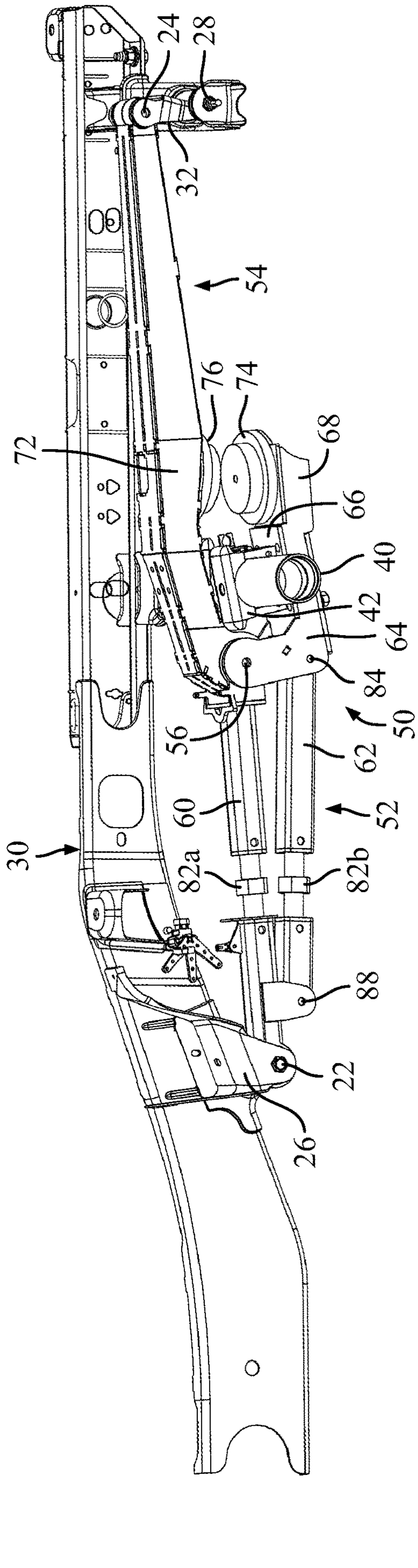
FIG. 10 is a schematic side view of yet another embodiment of a linkage assembly connected to a vehicle frame.
Figure 11:
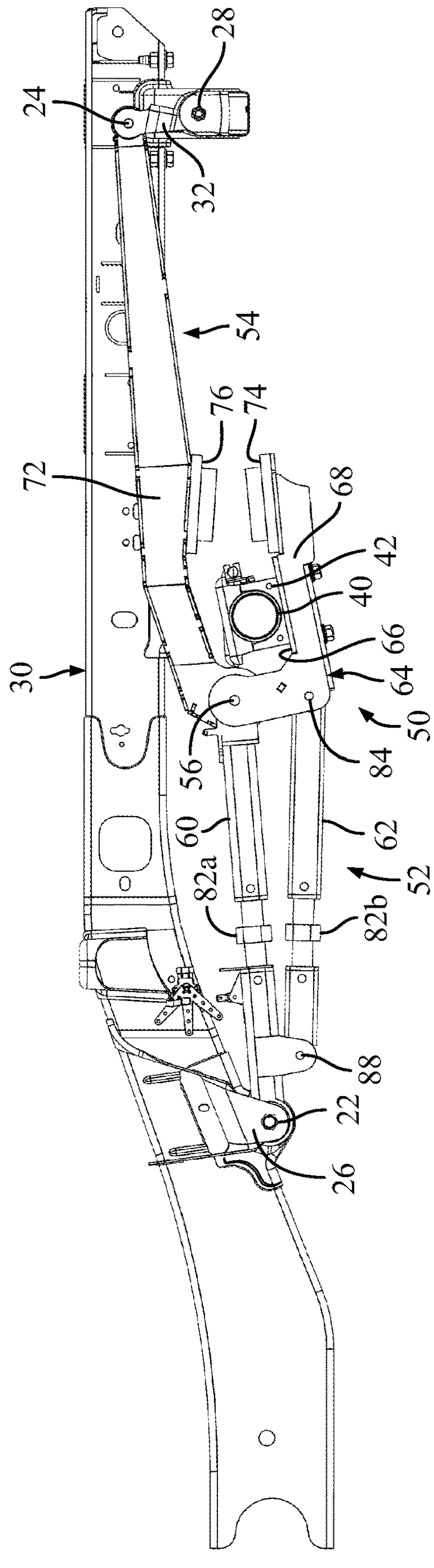
FIG. 11 is a perspective view of the arrangement of FIG. 10.

With reference next to FIGS. 10 and 11, another variation of a linkage assembly 50 is illustrated attached to a frame 30 of a vehicle. The illustrated linkage assembly 50 includes a first link 52 having a first arm 60 and a second arm 62 that are attached to one another at a third joint 88 and extend to and are attached to a connector portion 64. The first arm 60 is attached to the connector portion 64 via a main joint 56. The second arm 62 is attached to the connector portion 64 via a second joint 84. A second link 54 is rotatably connected to the connector portion 64 via the main joint 56. Thus, the first link 52 and second link 54 rotate relative to one another about the main joint 56. Notably, however, the main joint 56, at which the first link 52 rotatably connects to the second link 54 is also the joint 56 at which the first arm 60 connects to the connector portion 64. In a manner as discussed above, the frame 30 includes first and second frame mounts 26, 28, to which a leaf spring may have been originally mounted, with the first frame mount 26 typically being directed closer to the front of the vehicle than the second frame mount 28. The first link 52 is rotatably attached to the first frame mount 26 via a first connector 22. The illustrated second link 54 has a second connector 24 that is rotatably attached to a shackle 32, which in turn is rotatably attached to the second frame mount 28.

Continuing with reference to FIGS. 10 and 11, a spring mount arm 68 extends from the connector portion 64 so as to overlap a spring mount portion 72 of the second link 54. A first spring mount 74 is supported by the spring mount arm 68, and a second spring mount 76 is supported by the spring mount portion 72. The first and second spring mounts 74, 76 are arranged and configured so that an air spring (not shown) can be mounted therebetween, thus effectively establishing a spring between the first link 52 and second link 54. In the illustrated embodiment a saddle 66 is also defined on the spring mount arm 68, between the first spring mount 74 and the main joint 56. An axle 40 of a vehicle can be supported on the saddle 66 and can be secured in place on the saddle 66 by a U-shaped axle holder 41. In the illustrated embodiment, the main joint 56 between the first link 52 and second link 54 is positioned in front of the axle saddle 66, which in turn is in front of the spring mounts 74, 76. In fact, the spring mount arm 68 supports both the axle saddle 66 and the spring mount 74.

Still further variations can have other specific configurations. In another embodiment of a linkage assembly 50 depicted in FIG. 12, the first link 52 can comprise a single unitary member that supports the gas spring 70 and axle 40 and pivotably connects to the connector portion 56. The first link 52 also can pivot about first connector 22, which can be attached to first frame mount 26. The second link 54 can include a second linkage assembly 120 comprising first arm 122 and second arm 124 that are each pivotably connected to the connector portion 64 at one end and the shackle 32 of a second, opposite end. The shackle 32 can pivotably connect to the second frame mount 28. The second arm 124 can attach to the gas spring 70 so that the gas spring 70 is interposed between the first link 52 and the second arm 124 of the second link 54. The illustrated linkage assembly 50 can be attached to the first spring mount 26 and second spring mount 28. Notably, in the illustrated variation, as the axle 40 moves generally vertically, the first link 52, second link 54 and connector portion 64 move relative to one another, and loads are transmitted to the gas spring 70.

Figure 12:
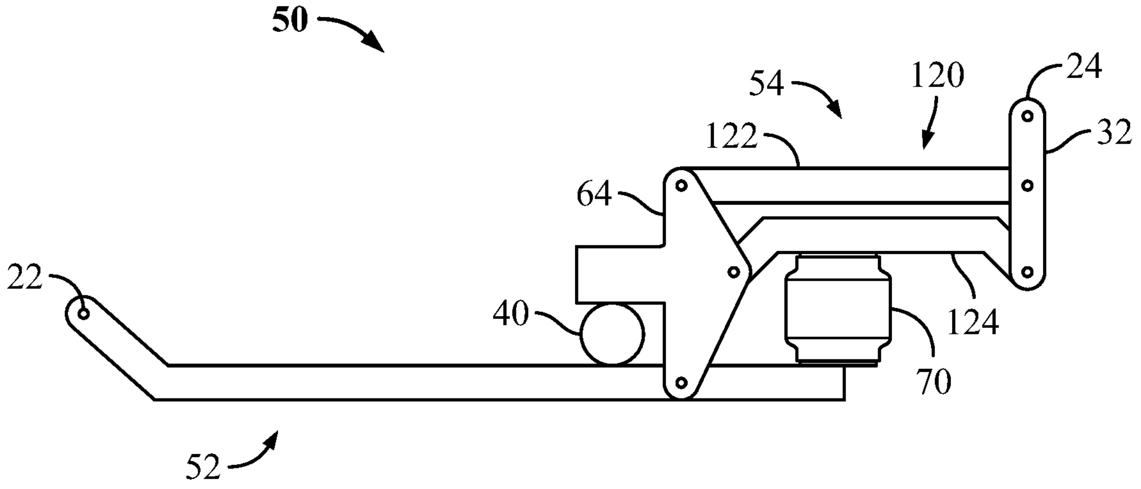
FIG. 12 is a schematic side view of another version of a linkage assembly.
Figure 13:
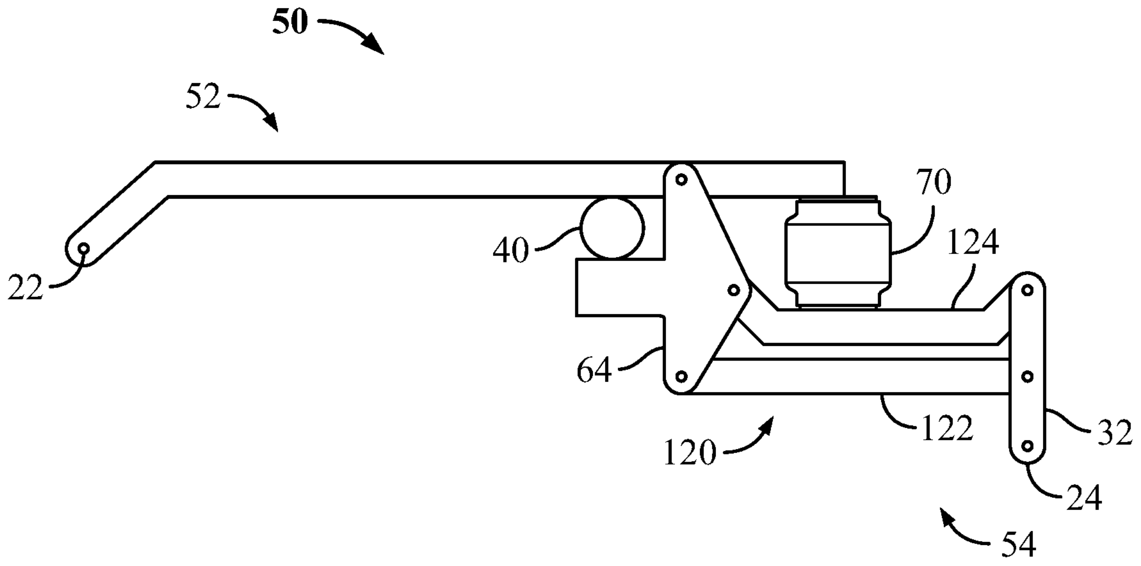
FIG. 13 is a schematic side view of yet another version of a linkage assembly.

With reference next to FIG. 13, the illustrated linkage assembly 50 is substantially similar to linkage assembly 50 of FIG. 12. Notably, in the embodiments illustrated above, the second frame mount 28 has been configured so that the shackle 32 depends from the second frame mount 28. However, it is to be understood that, in some factory configurations, the second frame mount 28 is configured so that the shackle 32 extends upwardly from the second spring mount 28. The linkage assembly 50 of FIG. 13 is configured to be able to attach to such a second frame mount 28 so that the shackle 32 extends generally upwardly from the second spring mount 28.

Figure 14:
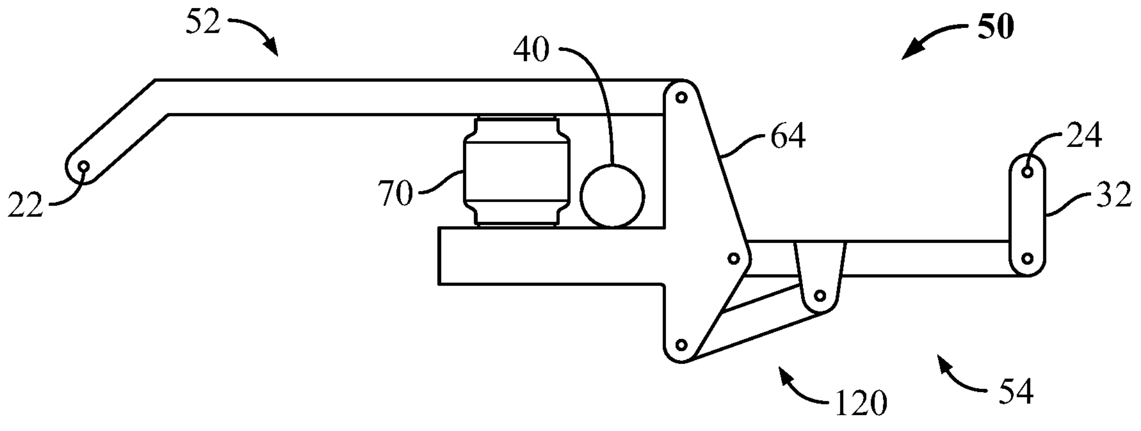
FIG. 14 is a schematic side view of still another version of a linkage assembly.

With additional reference next to FIG. 14, another embodiment of a linkage assembly 50 is shown in which the first link 52 comprises a unitary member, and the second link 54 comprises a secondary linkage 120. The connector portion 64 is rotatable relative to both the first link 52 and the second link 54. In the illustrated embodiment, the connector portion 64 supports both the axle 40 and the gas spring 70. When the axle 40 moves generally vertically during operation of the automobile, the first link 52, second link 54 and connector portion 64 will all move relative to one another, and loads from the axle 40 will be applied to the gas spring 70, which in this variation is interposed between the first link 52 and the connector portion 64.

Figure 15:
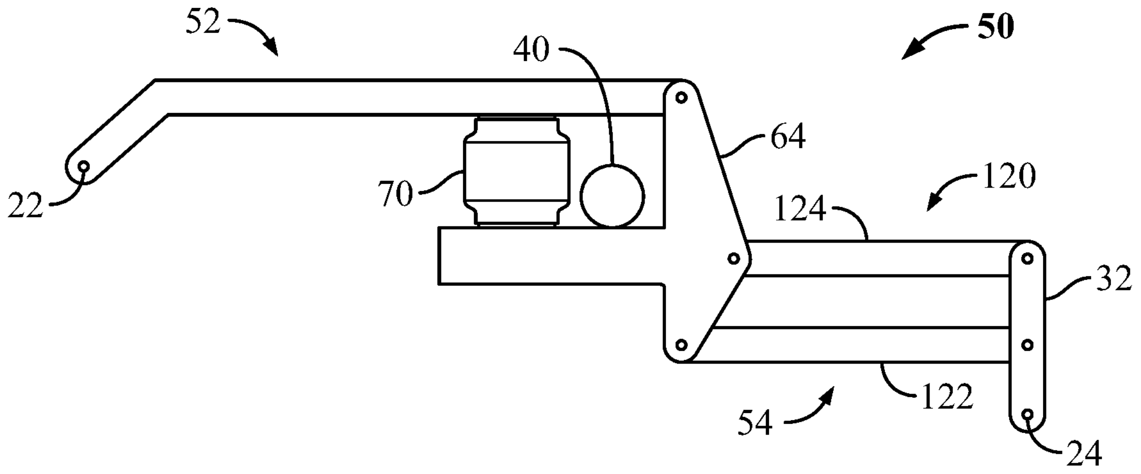
FIG. 15 is a schematic side view of a yet further version of a linkage assembly.

FIG. 15 shows another variation similar to FIG. 14, but in which the second link 54 includes a secondary linkage 120 with a first arm 122 and second arm 124 that are each configured to rotate relative to both the connector portion 64 and shackle 32. Further, as in FIG. 13 above, the shackle 32 is configured to extend upwardly from the second spring mount 28.

It is to be understood that in the embodiments discussed herein the gas spring 70 and axle 40 are supported by the linkage assembly 70. In some variations the gas spring is supported between the first link 52 and the second link 54, with the connector portion 64 held rigid as part of one or the other of the first link 52 and second link 54. In other variations the connector portion 64 is pivotable relative to both of the first link 52 and the second link 54, and the gas spring 70 can be interposed between the connector portion 64 and one or the other of the first link 52 and second link 54. In some variations the first link 52 and second link 54 are both rigid. However, in further variations one or the other of the first link 52 and second link 54 can employ a secondary linkage having relative movement within the link itself.

The embodiments and variations discussed above have disclosed structures with substantial specificity. This has provided a good context for disclosing and discussing inventive subject matter. However, it is to be understood that other variations may employ different specific structural shapes and interactions.

Although inventive subject matter has been disclosed in the context of certain preferred or illustrated variations and examples, it will be understood by those skilled in the art that the inventive subject matter extends beyond the specifically disclosed variations to other alternatives and/or uses of the invention and obvious modifications and equivalents thereof. In addition, while a number of variations have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. For example, although FIGS. 9-11 do not actually show an air spring in place, it is anticipated that air springs such as depicted and discussed in connection with other figures can be included as discussed. Also, it is anticipated that the various embodiments can selectively incorporate components and aspects of other embodiments disclosed herein. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed variations described above, but should be determined only by a fair reading of the claims that follow.

What is claimed is:

1. A gas spring suspension system for a vehicle, comprising:

a linkage assembly having:

a first link defining a first end portion which is pivotably attached to a frame of the vehicle, a second end portion, and a middle portion disposed between the first and second end portions, and a second link defining a first end portion which is pivotably attached to the middle portion of the first link defining a first pivot point, a second end portion pivotably attached to a linkage which is pivotably attached to the frame of the vehicle, and a middle portion disposed between the first and second end portions;

a gas spring supported between and in contact with both the second end portion of the first link and the middle portion of the second link;

wherein an axle of the vehicle is attached to the first link.

2. The gas spring suspension system of claim 1, wherein the first link is configured to be rigid during operation so that the entire first link is rotatable as a unit about the frame of the vehicle.

3. The gas spring suspension system of claim 2, wherein the first link comprises a first arm and a second arm, wherein a length of the second arm is adjustable via a second arm length adjustment structure to adjust a distance between the second end portion of the first link to the middle portion of the second link for tuning a spring rate of the gas spring suspension system.

4. The gas spring suspension system of claim 3, wherein the first arm comprises a first arm length adjustment structure configured to selectively change a length of the first arm.

5. The gas spring suspension system of claim 3, wherein the second arm length adjustment structure comprises an armbuckle.

6. The gas spring suspension system of claim 1, additionally comprising a gas supply configured to selectively add gas to and remove gas from the gas spring.

7. The gas spring suspension system of claim 6, additionally comprising a height control valve configured to measure a static ride height of the vehicle axle relative to a vehicle frame, and to selectively add gas to the gas spring when the static ride height is below an optimal level.

8. The gas spring suspension system of claim 1, wherein the first link comprises a first connector configured to pivotably attach to a first frame mount of the frame of the vehicle and the second link comprises a second connector configured to pivotably attach to a second frame mount of the frame of the vehicle so that the linkage assembly attaches to the frame of the vehicle at only the first frame mount and second frame mount.

9. A method of replacing a leaf spring suspension system of a vehicle, comprising removing a leaf spring from a first frame mount disposed forwardly of a vehicle axle and from a second frame mount disposed rearwardly of the vehicle axle;

attaching a first connector of a linkage assembly to the first frame mount;

attaching a second connector of a linkage assembly to the second frame mount;

the linkage assembly comprising a first link and a second link, the first link defining a first end portion, second end portion and a middle portion disposed between the first and second end portions, the second link defining a first end portion, second end portion and a middle portion disposed between the first and second end portions of the second link, the first end portion of the second link being pivotably attached to the middle portion of the first link, and a gas spring that is interposed between and in contact with the second end portion of the first link and middle portion of the second link; and attaching the vehicle axle to the linkage assembly so that as the vehicle axle moves generally vertically, the first link moves relative to the second link and a load is applied to the gas spring.

10. The method of claim 9, wherein the first link comprises a first arm and a second arm, and additionally comprising changing a length of the second arm so that a distance between the second end portion of the first link and the middle portion of the second link is adjusted to tune a spring rate of the suspension system.

11. The method of claim 9, additionally comprising monitoring a static ride height of the axle and adding or removing gas from the gas spring until the static ride height is at an optimal level.

12. The gas spring suspension system of claim 1 wherein the axle of the vehicle is attached to the first link in front of the first pivot point.

13. The gas spring suspension system of claim 1 wherein the axle of the vehicle is attached to the first link behind the first pivot point.

14. The method of claim 9 further comprising attaching the axle of the vehicle in front of the pivotable connection between the first end portion of the second link and the middle portion of the first link.

15. The method of claim 9 further comprising attaching the axle of the vehicle behind the pivotable connection between the first end portion of the second link and the middle portion of the first link.

* * * * *